United States Patent
Fife et al.

(10) Patent No.: US 6,504,888 B1
(45) Date of Patent: Jan. 7, 2003

(54) APPARATUS AND METHODS OF FLOW MEASUREMENT FOR A BOILING WATER REACTOR INTERNAL PUMP

(75) Inventors: Alex B. Fife, San Jose, CA (US); Hwang Choe, Saratoga, CA (US); Jack T. Matsumoto, Sunnyvale, CA (US)

(73) Assignee: General Electric Company, Schenectady, NY (US)

( * ) Notice: Subject to any disclaimer, the term of this patent is extended or adjusted under 35 U.S.C. 154(b) by 22 days.

(21) Appl. No.: 09/690,623

(22) Filed: Oct. 17, 2000

Related U.S. Application Data

(60) Provisional application No. 60/172,007, filed on Dec. 23, 1999.

(51) Int. Cl.[7] ............................................. G21C 17/032
(52) U.S. Cl. ...................... 376/246; 376/203; 376/204; 376/245; 376/246; 376/247; 376/294; 376/372; 376/392; 376/407; 73/861.52; 415/109; 415/110; 277/361; 277/366; 277/516; 277/580; 277/599; 277/318
(58) Field of Search ................................ 376/203, 204, 376/245, 246, 247, 294, 372, 392, 407; 73/861.52; 415/109, 110; 277/361, 366, 516, 580, 599, 318

(56) References Cited

U.S. PATENT DOCUMENTS

| | | | | |
|---|---|---|---|---|
| 3,380,649 A | * | 4/1968 | Roberts | 165/112 |
| 3,467,578 A | * | 9/1969 | Kornbichler et al. | 162/237 |
| 3,719,524 A | * | 3/1973 | Ripley et al. | 261/DIG. 13 |
| 4,024,911 A | * | 5/1977 | Forrest et al. | 376/203 |
| 4,265,589 A | * | 5/1981 | Watson et al. | 415/118 |
| 4,315,800 A | * | 2/1982 | Yoshimoto et al. | 138/44 |
| 4,842,806 A | * | 6/1989 | Ohtomi | 376/247 |
| 5,295,171 A | * | 3/1994 | Aburomia et al. | 376/370 |
| 5,427,500 A | * | 6/1995 | Hyll | 277/351 |
| 5,499,902 A | * | 3/1996 | Rockwood | 184/11.2 |
| 5,615,239 A | * | 3/1997 | Deaver et al. | 376/247 |
| 5,721,758 A | * | 2/1998 | Fife et al. | 376/294 |
| 5,893,703 A | * | 4/1999 | Weinrib | 277/345 |
| 6,163,588 A | * | 12/2000 | Matsumoto et al. | 376/246 |
| 6,210,103 B1 | * | 4/2001 | Ramsay | 277/318 |

FOREIGN PATENT DOCUMENTS

| | | | | |
|---|---|---|---|---|
| DE | 002740774 A | * | 3/1979 | |
| JP | 62081599 A | * | 4/1967 | |
| JP | 357083612 A | * | 5/1982 | |
| JP | 5-346484 | * | 12/1993 | |
| SU | 0714052 | * | 2/1980 | |

* cited by examiner

Primary Examiner—Michael J. Carone
Assistant Examiner—John Richardson
(74) Attorney, Agent, or Firm—Armstrong Teasdale LLP

(57) ABSTRACT

A reactor pressure vessel (RPV) for a nuclear reactor that permits measurement of the flow through each reactor internal pump (RIP) is described. The reactor pressure vessel also includes at least one reactor internal pump that includes an impeller and a pump diffuser. At least two seal rings extend circumferentially around an outer surface of the diffuser housing outer wall and are located in circumferential grooves in the housing outer wall. At least one lateral bore extends through the housing outer wall into a diffuser housing longitudinal flow passage. Each lateral bore is located in an area between two adjacent seal rings, with each inter-seal ring area containing one lateral bore. At least one pressure tap bore extends from the outer surface of the RPV bottom head petal, through the pump deck to an inner surface of a pump deck opening. Each pressure tap bore is aligned with an area in the RIP containing a corresponding lateral bore.

12 Claims, 6 Drawing Sheets

APPARATUS AND METHODS OF FLOW MEASUREMENT FOR A BOILING WATER REACTOR INTERNAL PUMP

CROSS REFERENCE TO RELATED APPLICATIONS

This application claims the benefit of U.S. Provisional Application No. 60/172,007, filed Dec. 23, 1999.

BACKGROUND OF THE INVENTION

This invention relates generally to nuclear reactors and more particularly, to flow measurement for reactor internal pumps in a boiling water reactor.

A reactor pressure vessel (RPV) of a boiling water reactor (BWR) typically has a generally cylindrical shape and is closed at both ends, e.g., by a bottom head and a removable top head. A top guide typically is spaced above a core plate within the RPV. A core shroud, or shroud, typically surrounds the core plate and is supported by a shroud support structure. Particularly, the shroud has a generally cylindrical shape and surrounds both the core plate and the top guide. The core center axis is substantially coaxial with the center axis of the shroud, and the shroud is open at both ends so that water can flow up through the lower end of the shroud and out through the upper end of the shroud. The shroud, top guide, and core plate limit lateral movement of the core fuel bundles.

The RPV also includes reactor internal pumps (RIP) located in the annulus between the shroud and the pressure vessel wall. The internal pumps provide circulation of water in the RPV. Typically the RIP flow is determined by measuring the fluid temperature, pump speed, and the pressure difference between four pairs of location points. One location point is upstream of the RIPs, and the other location point is downstream of the RIPs. The pressure difference verses flow correlation is based on simulated measurements in a test loop.

The upstream pressure measurement points are located in the annulus above the RIPs. The pressure and velocity gradients of the water in this region are small. That is, there is a negligible change in pressure with location in the horizontal X and Y directions, and the pressure change in the vertical direction corresponds to the change in the static head of water. This means that the measured pressure difference is not sensitive to exact location of the upstream measurement point. However, the situation for the downstream measurement point is very different.

The flow exiting the RIP diffuser is at high velocity and has a swirling pattern. The flow has to flow around the RIP impeller shaft and nozzle, and change directions from downward to radial inward to flow into the bottom head plenum. The flow pattern is very complex and turbulent. To overcome this turbulent flow problem, the downstream measurement point for known reactors is inside the shroud where the flow pattern is less complex and more steady. However, the pressure at this point is a function of the flow through several RIPs, not just one RIP, therefore, the performance of individual pumps in the reactor cannot be directly measured. In addition, the accuracy of the measurement is sensitive to the exact location of the downstream measurement. Further, the accuracy of the measurements depend upon how well the test loop replicates the reactor parameters and configuration. Changing the configuration of a boiling water reactor downstream of the RIP changes the calibration of the test loop.

It would be desirable to accurately measure flow through each RIP in a boiling water reactor based on a calibration curve that is independent of the geometry of the shroud support and bottom head plenum configuration.

BRIEF SUMMARY OF THE INVENTION

A reactor pressure vessel for a nuclear reactor that permits measurement of the flow through each RIP, based on a calibration curve that is independent of the geometry of the pressure vessel, includes at least one pressure tap into each RIP. In an exemplary embodiment, the reactor pressure vessel includes a side wall, a reactor core shroud, a bottom head, and a bottom head petal attached to the bottom head. The bottom head petal includes a reactor shroud support flange, a reactor side wall support flange, and a reactor internal pump deck extending between the shroud support flange and the side wall flange. The pump deck having at least one opening extending therethrough to accommodate the RIPs.

The reactor pressure vessel also includes at least one reactor internal pump. Each RIP extends through a pump deck opening. Each pump includes an impeller and a diffuser. The diffuser includes a housing having an outer wall and a plurality of turning vanes that define a plurality of flow passages extending longitudinally through the housing. At least two seal rings extend circumferentially around an outer surface of the housing outer wall. The seal rings engage the inner surface of a pump deck opening to create a seal to reduce bypass leakage. Each seal ring is spaced apart from an adjacent seal ring in the longitudinal direction. The outer surface of the housing outer wall also includes a plurality of circumferential grooves. Each circumferential groove is sized to receive a seal ring.

At least one lateral bore extends through the housing outer wall into a diffuser housing flow passage. Each lateral bore is located in an area between two adjacent seal rings, with each inter-seal ring area containing one lateral bore. At least one pressure tap bore extends from the outer surface of the bottom head petal, through the pump deck to an inner surface of a pump deck opening. Each pressure tap bore is aligned with an area containing a corresponding lateral bore. The reactor pressure vessel also includes at least one pressure tap bore extending through the side wall of the pressure vessel. Each side wall pressure tap is located above the intake of a RIP.

To measure the flow through each RIP, a pressure measurement is taken at the pressure vessel side wall pressure tap upstream of the RIP. Also a pressure measurement is taken in the pump diffuser utilizing the pressure tap extending through the bottom head petal. The pressure differential is then calculated. The calibration curve created during the factory acceptance test of the RIP is used to translate pressure differential to pump flow rate.

The above described reactor pressure vessel and flow measurement system provides for calibrated flow measurements of each RIP. Also, the flow measurement system permits developing the flow verses pressure head curve during the factory test of each RIP without the need for a special test facility that replicates the reactor shroud support and bottom head geometry. Further, the seal rings, which extend circumferentially around the diffuser housing and engage the inner surface of a pump deck opening, permit disassembly of the pump for maintenance.

DETAILED DESCRIPTION OF THE INVENTION

Figure 1:
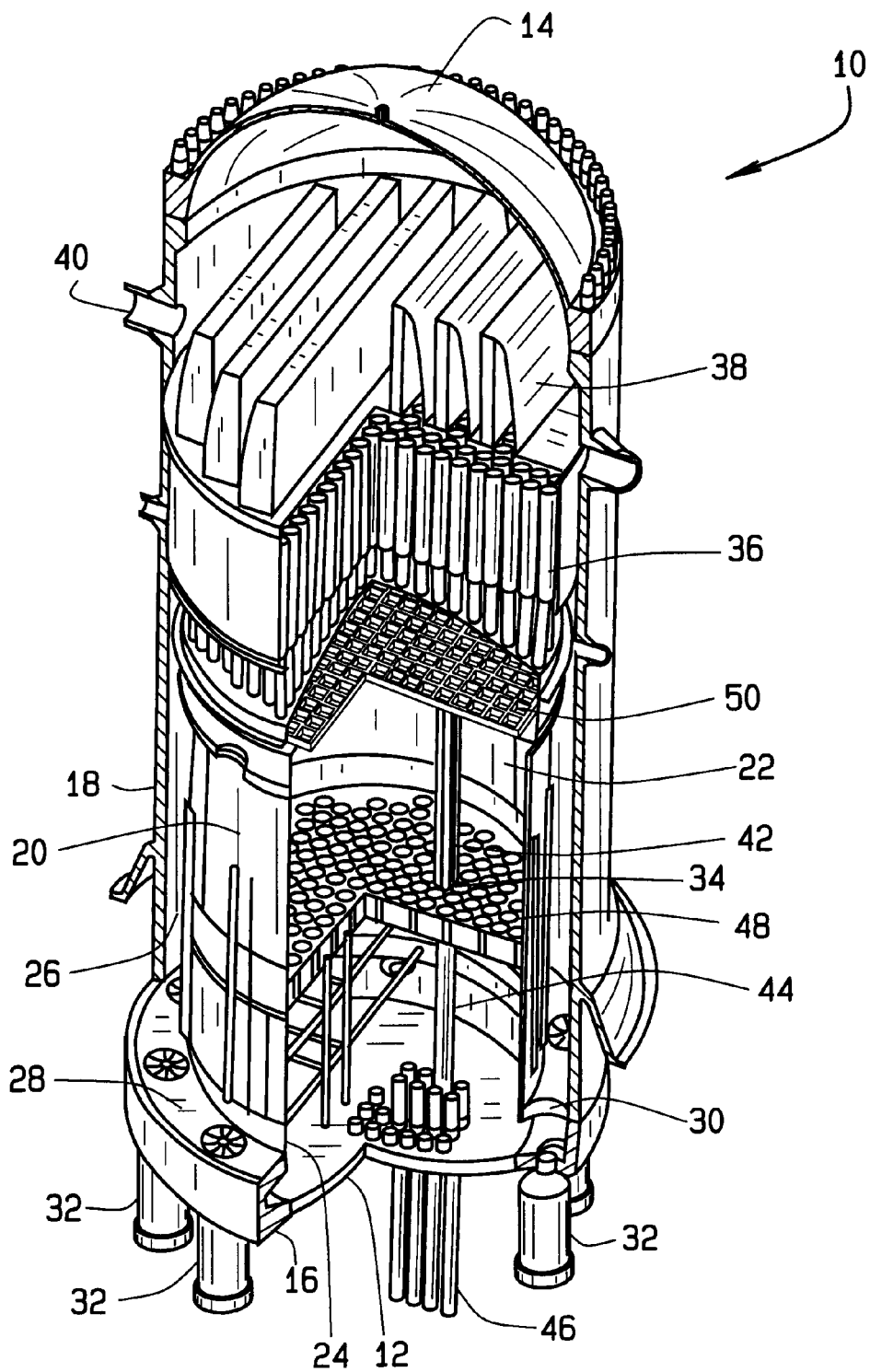
FIG. 1 is a sectional view, with parts cut away, of a boiling water nuclear reactor pressure vessel.
Figure 2:
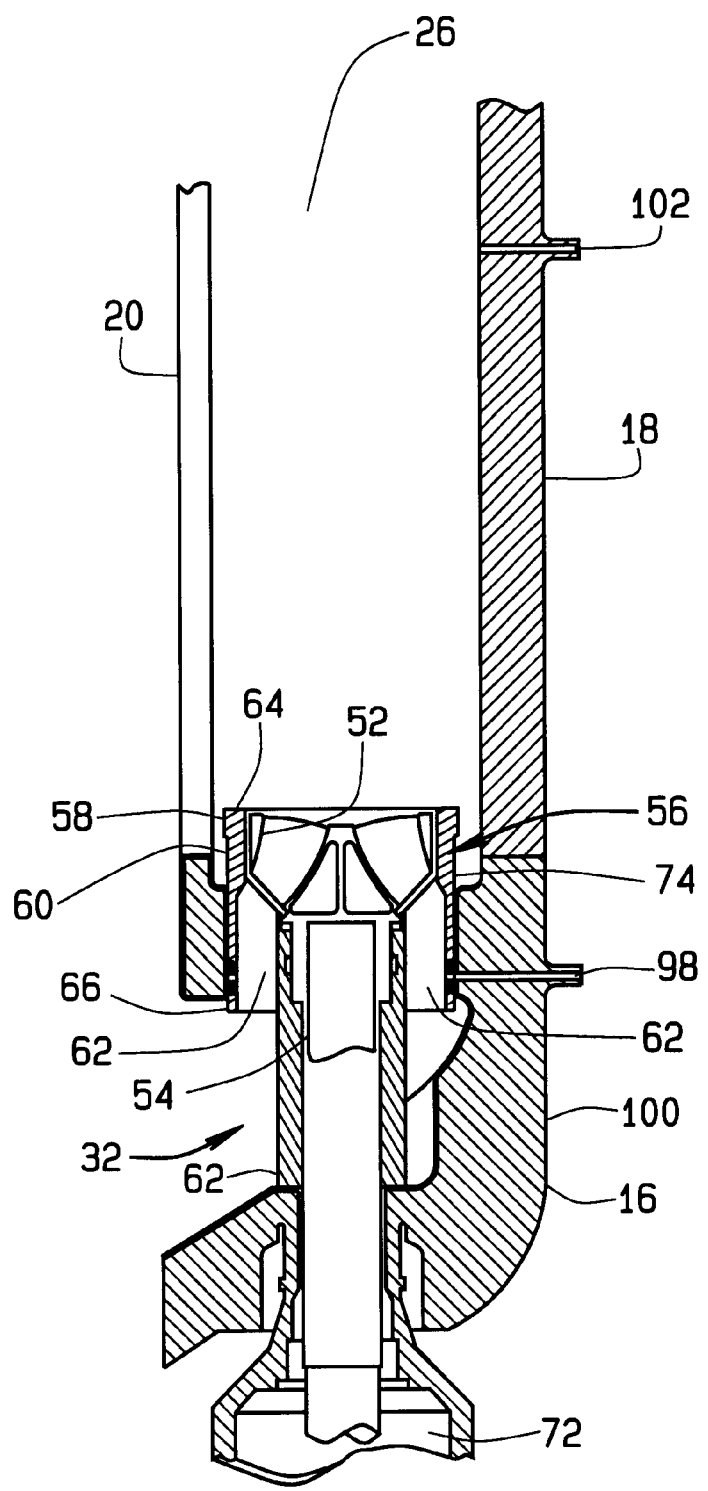
FIG. 2 is a side sectional view of a reactor internal pump in accordance with an embodiment of the present invention.
Figure 3:
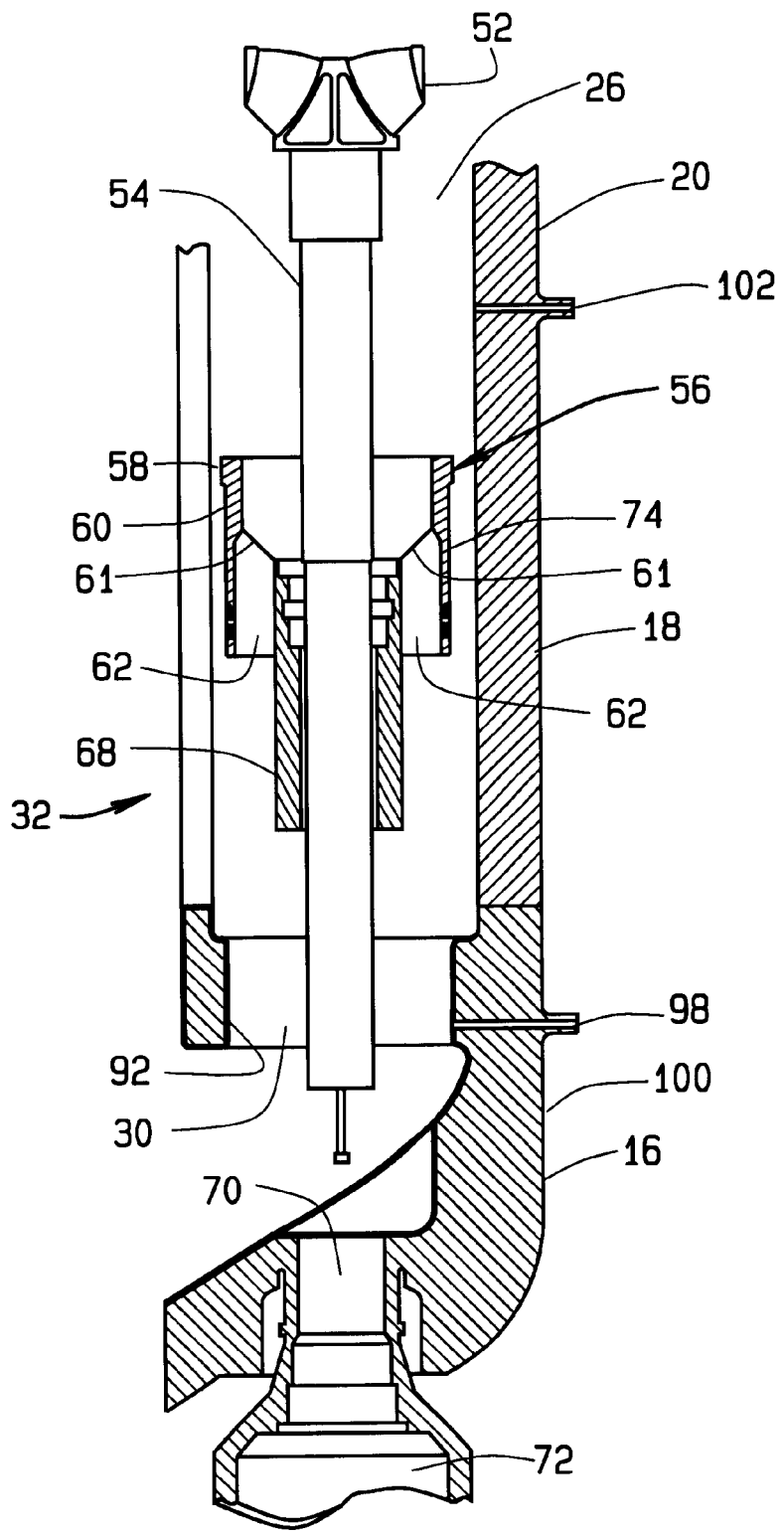
FIG. 3 is an exploded view of the reactor internal pump shown in FIG. 2.
Figure 4:
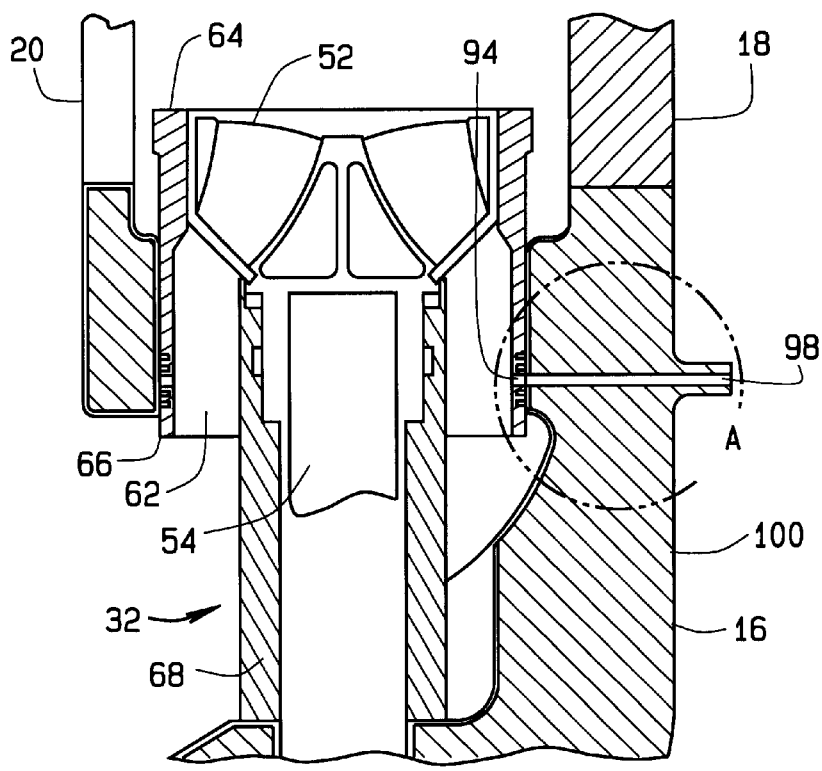
FIG. 4 is an enlarged view of a portion of the reactor internal pump shown in FIG. 2.
Figure 5:
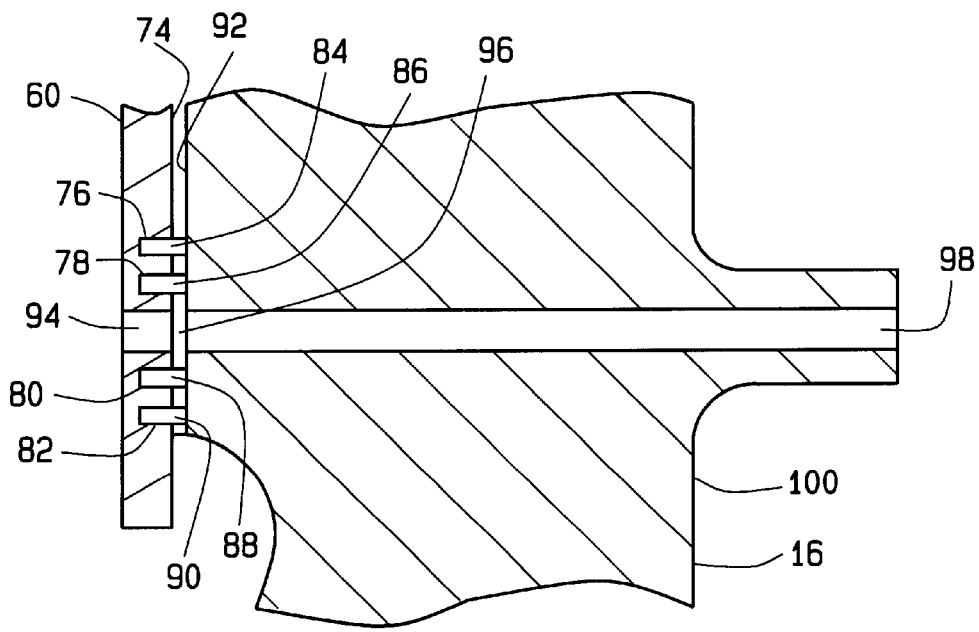
FIG. 5 is an enlarged view of Section A of FIG. 4.

FIG. 1 is a sectional view, with parts cut away, of a boiling water nuclear reactor pressure vessel (RPV) 10. RPV 10 has a generally cylindrical shape and is closed at one end by a bottom head 12 and at its other end by a removable top head 14. A bottom head petal 16 extends from bottom head 12 and supports a side wall 18 of RPV 10. A cylindrically shaped core shroud 20 surrounds a reactor core 22 and is supported by a shroud support 24. An annulus 26 is formed between shroud 20 and side wall 18. A shroud support reactor internal pump deck 28, which has a ring shape, extends between shroud 20 and bottom head petal 16. Pump deck 28 includes a plurality of circular openings 30, with each opening housing a reactor internal pump (RIP) 32. Reactor internal pumps 32 cause the water in RPV 10 to flow through annulus 26 and into core 22.

Heat is generated within core 22, which includes fuel bundles 34 of fissionable material. Water circulated up through core 22 is at least partially converted to steam. A steam separator 36 separates steam from water, which is recirculated. Residual water is removed from the steam by a steam dryer 38. The steam exits RPV 10 through a steam outlet 40 near vessel top head 14.

The amount of heat generated in core 22 is regulated by inserting and withdrawing control rods 42 of neutron absorbing material, such as for example, hafnium. To the extent that control rod 42 is inserted into fuel bundle 34, it absorbs neutrons that would otherwise be available to promote the chain reaction which generates heat in core 22. Control rod guide tubes 44 maintain the vertical motion of control rods 42 during insertion and withdrawal. Control rod drives 46 effect the insertion and withdrawal of control rods 42. Control rod drives 46 extend through bottom head 12.

Fuel bundles 34 are aligned by a core plate 48 located at the base of core 22. A top guide 50 aligns fuel bundles 34 as they are lowered into core 22. Core plate 48 and top guide 50 are supported by core shroud 20.

An exemplary embodiment of reactor internal pump 32, as shown in FIGS. 2, 3, 4, and 5, includes an impeller 52, a drive shaft 54 coupled to impeller 52, and a diffuser 56. Diffuser 56 includes a housing 58 having an outer wall 60 and a plurality of turning vanes which define a plurality of flow passages 62 extending longitudinally through housing 58 from a first end 64 to a second end 66 of housing 58. A drive shaft housing 68 extends partially into housing 58 from second end 66 of housing 58. Drive shaft 54 extends through drive shaft housing 68 and through an opening 70 in bottom head petal 16. Drive shaft operatively couples to RIP motor 72. RIP 32 is configured so that impeller 52, drive shaft 54, and diffuser 56 can be removed from RPV 10 for maintenance.

An outer surface 74 of diffuser housing outer wall 60 includes grooves 76, 78, 80, and 82. Grooves 76, 78, 80, and 82 are spaced apart from each other and extend circumferentially around housing outer wall 60. Seal rings 84, 86, 88, and 90 are located in grooves 76, 78, 80, and 82 respectively. Seal rings 84, 86, 88, and 90 engage an inner surface 92 of pump deck opening 30 to form a seal and reduce bypass leakage of water around RIP 32.

Diffuser housing 58 also includes a lateral bore 94 extending laterally through housing outer wall 60 from outer surface 74 to a flow passage 62. Lateral bore 94 is located in the area between seal rings 86 and 88. Lateral bore 94 is sized so that the pressure in longitudinal diffuser housing flow passages 62 is equal to the pressure in an annular cavity 96 formed by outer wall 60, seal ring 86, seal ring 88, and inner surface 92 of pump deck opening 30. Lateral bore 94 is in fluid communications with flow passage 62 and annular cavity 96. A first pressure tap 98 extends from an outer surface 100 of bottom head petal 16, through bottom head petal 16 and through pump deck 28 to inner surface 92 of pump deck opening 30. Pressure tap 98 is located so as to be aligned with and be in fluid communications with annular cavity 96. Because the pressure inside bore 62, adjacent to lateral bore 94, is equal to the pressure in annular cavity 96, pressure tap 98 does not need to be aligned with lateral bore 94.

A second pressure tap 102 extends through RPV side wall 18 into annulus 26 at a point upstream of RIP 32. The pressure differential between the pressure measured at first pressure tap 98 and second pressure tap 102 is directly related to the flow rate through RIP 32. A calibration curve is developed during the testing and plant acceptance of RIP 32 prior to installation of RIP 32 into RPV 10.

As impeller 52 rotates in diffuser 56, water is drawn from annulus 26 through RIP 32 and into core 22. To measure the flow rate through each RIP 32, a pressure is measured at first pressure tap 98 and at second pressure tap 102. A pressure differential ($\Delta P$) is calculated from the pressure measurements obtained at first and second pressure taps 98 and 102. Using a calibration curve developed for each RIP 32 that relates $\Delta P$ to flow rate, the flow rate of each RIP 32 can be determined.

Figure 6:
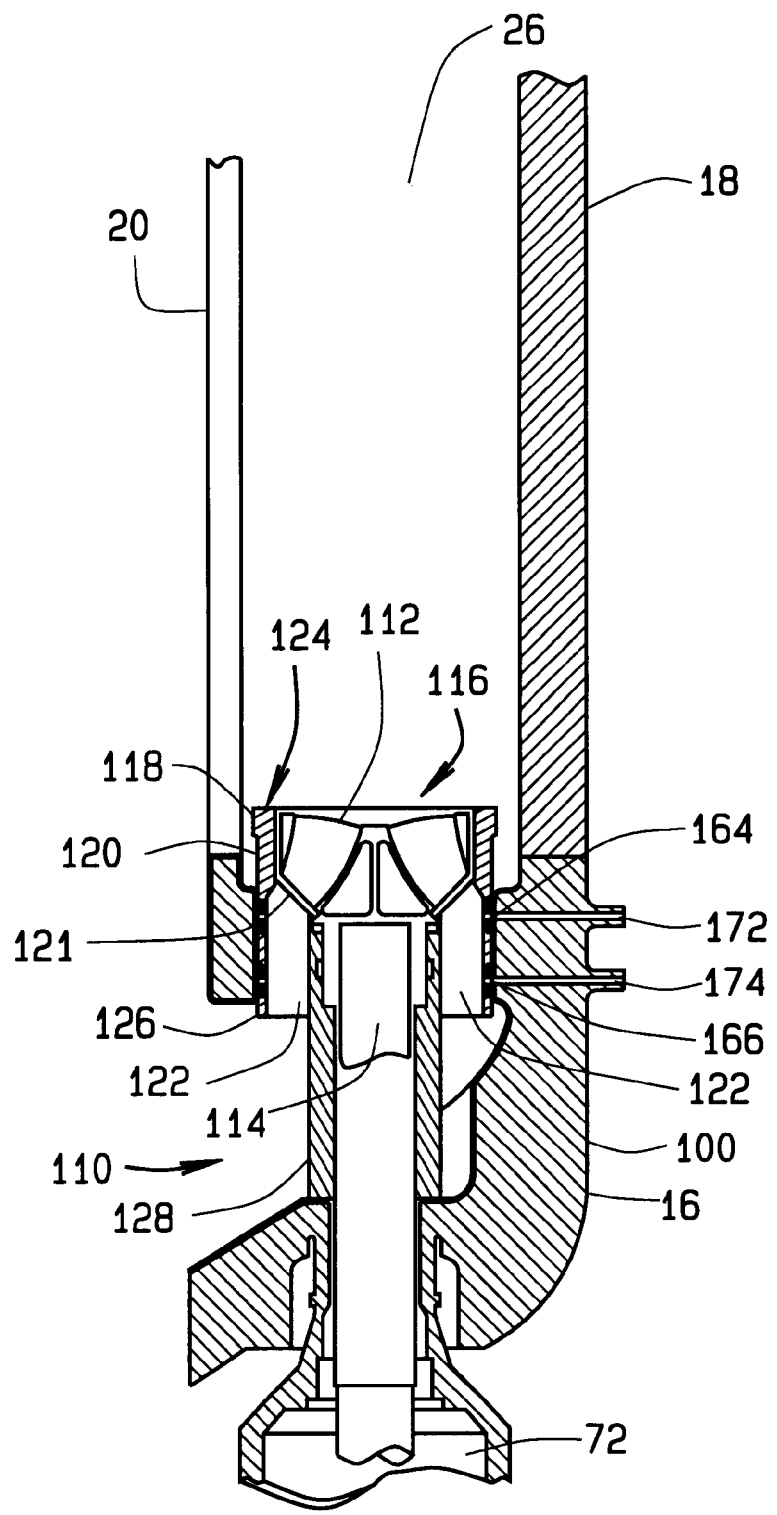
FIG. 6 is a side sectional view of a reactor internal pump in accordance with another embodiment of the present invention.
Figure 7:
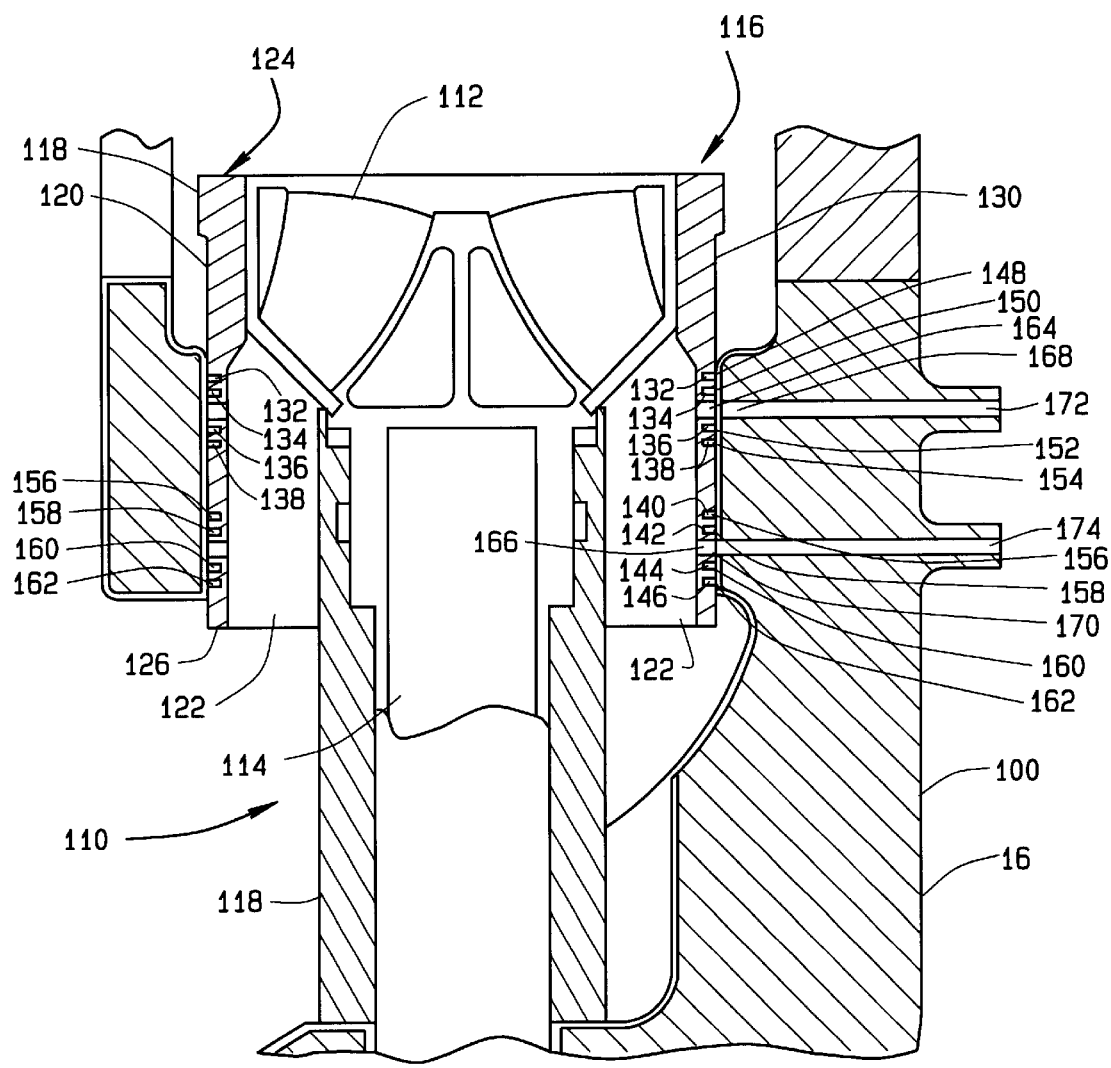
FIG. 7 is an enlarged view of a portion of the reactor internal pump shown in FIG. 6.

Another exemplary embodiment of a reactor internal pump (RIP) 110 is shown in FIGS. 6 and 7. RIP 110 is similar to RIP 32 and includes an impeller 112, a drive shaft 114 coupled to impeller 112, and a diffuser 116. Diffuser 116 includes a housing 118 having a wall 120 and a plurality of turning vanes 121 which define a plurality of flow passages 122 extending longitudinally through housing 118 from a first end 124 to a second end 126 of housing 118. A drive shaft housing 128 extends partially into housing 118 from second end 126 of housing 118. Drive shaft 114 extends through drive shaft housing 128 and through opening 70 in bottom head petal 16. Drive shaft 128 operatively couples to RIP motor 72. RIP 112, like RIP 32, is configured so that impeller 112, drive shaft 114, and diffuser 116 can be removed from RPV 10 for maintenance.

An outer surface 130 of diffuser housing wall 120 includes grooves 132, 134, 136, 138, 140, 142, 144, and 146. Grooves 132, 134, 136, 138, 140, 142, 144, and 146 are spaced apart from each other and extend circumferentially around housing wall 120. Seal rings 148, 150, 152, 154, 156, 158, 160, and 162 are located in grooves 132, 134, 136, 138, 140, 142, 144, and 146 respectively. Seal rings 148, 150, 152, 154, 156, 158, 160, and 162 engage an inner surface 92 of pump deck opening 30 to form a seal and reduce bypass leakage of water around RIP 110.

Diffuser housing 118 also includes a lateral bores 164 and 166 extending laterally through housing outer wall 120 from outer surface 130 to flow passages 122. Lateral bore 164 is located in the area between seal rings 150 and 152, and lateral bore 166 is located in the area between seal rings 158 and 160. Lateral bore 164 is sized so that the pressure in longitudinal diffuser housing flow passages 122 just down stream of impeller 112 is equal to the pressure in an annular cavity 168 formed by outer wall 120, seal ring 150, seal ring 152, and inner surface 92 of pump deck opening 30. Lateral bore 164 is in fluid communications with flow passage 122 and annular cavity 168. Similarly, lateral bore 166 is sized so that the pressure in longitudinal diffuser housing flow passages 122 near second end 126 of housing 118 is equal to the pressure in an annular cavity 170 formed by outer wall 120, seal ring 158, seal ring 160, and inner surface 92 of pump deck opening 30. Lateral bore 166 is in fluid communications with flow passage 122 and annular cavity 170. A first pressure tap 172 and a second pressure tap 174 extend from an outer surface 100 of bottom head petal 16, through bottom head petal 16 and through pump deck 28 to inner surface 92 of pump deck opening 30. Pressure tap 172 is located so as to be aligned with and be in fluid communications with annular cavity 168 and pressure tap 174 is located so as to be aligned with and be in fluid communications with annular cavity 170. The pressure inside flow passage 122, adjacent to lateral bore 164, is equal to the pressure in annular cavity 168, therefore, pressure tap 172 does not need to be aligned with lateral bore 164. Similarly, the pressure inside flow passage 122, adjacent to lateral bore 166, is equal to the pressure in annular cavity 170, therefore, pressure tap 174 does not need to be aligned with lateral bore 166.

To measure the flow rate through RIP 110, a pressure is measured at first pressure tap 172 and at second pressure tap 174. A pressure differential (ΔP) is calculated from the pressure measurements obtained at first and second pressure taps 172 and 174. Using a calibration curve developed for REP 110 that relates ΔP to flow rate, the flow rate of RIP 110 can be determined. Because RIP 110 includes two lateral bores 164 and 166 through housing wall 120, a separate pressure tap through RPV side wall 18 is not needed to determine the flow rate through RIP 110.

Alternate embodiments of RIP 32 and RIP 110 can include one, three, or four seal rings located above and below each lateral bore. As described above, RIP 32 and RIP 110 include two seal rings above and below each lateral opening.

The above described reactor internal pumps 32 and 110 permit calibrated flow measurements of each RIP in RPV 10. A flow measurement through RIPs 32 or 110 is obtained using calibration curves developed during the factory test of each RIP without the need for a special test facility that replicates reactor shroud support 24 and bottom head 12 geometry. Additionally, the above described reactor internal pumps 32 and 110 permit monitoring of an individual RIP performance in a reactor that includes a plurality of RIPs. Further, the above described reactor internal pumps 32 and 110 permit maintenance using normal RIP maintenance procedures.

While the invention has been described and illustrated in terms of various specific embodiments, those skilled in the art will recognize that the invention can be practiced with modification within the spirit and scope of the claims.

What is claimed is:

1. A reactor pressure vessel for a nuclear reactor, said pressure vessel comprising:

a bottom head petal attached to a bottom head, said bottom head petal comprising a reactor shroud support flange, a reactor side wall flange and a reactor internal pump deck extending between said shroud support flange and said side wall flange, said pump deck having at least one opening extending therethrough;

at least one reactor internal pump, each said pump extending through a pump deck opening, said pump comprising an impeller and a diffuser, said diffuser comprising a housing, said housing comprising:

(a) an outer wall and a plurality of vanes defining a plurality of flow passages extending longitudinally through said housing;

(b) at least two seal rings, each said seal ring spaced apart from an adjacent seal ring and extending circumferentially around an outer surface of said housing outer wall; and (c) at least one lateral bore extending through said outer wall into a diffuser housing longitudinal flow passage, each said lateral bore located in an area between two seal rings; and at least one pressure tap bore extending from an outer surface of said bottom head petal through said pump deck to an inner surface of said at least one pump deck opening, each said pressure tap bore aligned with said area containing a corresponding lateral bore.

2. A reactor pressure vessel in accordance with claim 1 further comprising a pressure tap bore extending through an outer wall of said pressure vessel.

3. A reactor pressure vessel in accordance with claim 2 wherein said diffuser housing comprises four seal rings, each said seal ring spaced apart from an adjacent seal ring and extending circumferentially around said housing, and one lateral bore located in an area between said second and said third seal ring.

4. A reactor pressure vessel in accordance with claim 1 wherein said diffuser housing comprises eight seal rings, each said seal ring spaced apart from an adjacent seal ring and extending circumferentially around said housing, and a first and a second lateral bore, said first lateral bore located in an area between said second and said third seal ring, said second lateral bore located in an area between said sixth and said seventh seal ring.

5. A reactor pressure vessel in accordance with claim 1 wherein said diffuser housing further comprises at least two circumferential grooves in said outer surface of said housing, each said groove sized to receive a seal ring.

6. A reactor pressure vessel in accordance with claim 1 wherein said diffuser housing comprises four seal rings, each said seal ring spaced apart from an adjacent seal ring and extending circumferentially around said housing, and a first and a second lateral bore, said first lateral bore located in an area between said first and said second seal ring, said second lateral bore located in an area between said third and said fourth seal ring.

7. A flow measurement system for a reactor internal pump in a boiling water nuclear reactor, the reactor comprising a reactor pressure vessel having a side wall, a shroud, and a bottom head petal having an outer surface, a shroud support flange, a side wall flange and a reactor internal pump deck extending between the shroud support flange and the outer wall flange, the pump deck having at least one opening sized to receive a reactor internal pump, each opening having an inner surface, said system comprising:

a reactor internal pump configured to extend through the pump deck opening, said pump comprising an impeller and a diffuser, said diffuser comprising a housing, said diffuser housing comprising:

(a) an outer wall and a plurality of vanes defining a plurality of flow passages extending longitudinally through said housing;

(b) at least two seal rings, each said seal ring spaced apart from an adjacent seal ring and extending circumferentially around an outer surface of said housing outer wall; and (c) at least one lateral bore extending through said outer wall into a diffuser housing longitudinal flow passage, each said lateral bore located in an area between two adjacent seal rings; and at least one pressure tap bore configured to extend from the outer surface of the bottom head petal through the pump deck to the inner surface of the pump deck opening, each said pressure tap bore configured to align with said diffuser housing area containing a corresponding lateral bore when said pump is positioned in the pump deck opening.

8. A flow measurement system in accordance with claim 7 further comprising a pressure tap bore configured to extend through the side wall of the pressure vessel.

9. A flow measurement system in accordance with claim 8 wherein said diffuser housing comprises four seal rings, each said seal ring spaced apart from an adjacent seal ring and extending circumferentially around said housing, and one lateral bore located in an area between said second and said third seal ring.

10. A flow measurement system in accordance with claim 7 wherein said diffuser housing comprises eight seal rings, each said seal ring spaced apart from an adjacent seal ring and extending circumferentially around said housing, and a first and a second lateral bore, said first lateral bore located in an area between said second and said third seal ring, said second lateral bore located in an area between said sixth and said seventh seal ring.

11. A flow measurement system in accordance with claim 7 wherein said diffuser housing further comprises at least two circumferential grooves in said outer surface of said housing, each said groove sized to receive a seal ring.

12. A flow measurement system in accordance with claim 7 wherein said diffuser housing comprises four seal rings, each said seal ring spaced apart from an adjacent seal ring and extending circumferentially around said housing, and a first and a second lateral bore, said first lateral bore located in an area between said first and said second seal ring, said second lateral bore located in an area between said third and said fourth seal ring.

* * * * *